(12) United States Patent
Chua

(10) Patent No.: US 8,533,792 B2
(45) Date of Patent: *Sep. 10, 2013

(54) E-MAIL BASED USER AUTHENTICATION

(75) Inventor: Fei Chua, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/029,563

(22) Filed: Feb. 17, 2011

(65) Prior Publication Data
US 2011/0145907 A1    Jun. 16, 2011

Related U.S. Application Data

(63) Continuation of application No. 11/275,429, filed on Dec. 30, 2005, now Pat. No. 7,921,456.

(51) Int. Cl.
*H04L 29/06*    (2006.01)

(52) U.S. Cl.
USPC ............ 726/5; 713/160; 713/161; 713/168; 713/170

(58) Field of Classification Search
USPC ............................................................ 726/5
See application file for complete search history.

(56) References Cited

U.S. PATENT DOCUMENTS

| | | | |
|---|---|---|---|
| 5,684,950 A | 11/1997 | Dare et al. | |
| 5,822,526 A * | 10/1998 | Waskiewicz | 709/206 |
| 6,038,597 A * | 3/2000 | Van Wyngarden | 709/219 |
| 6,115,040 A | 9/2000 | Bladow et al. | |
| 6,134,658 A | 10/2000 | Multerer et al. | |
| 6,182,227 B1 | 1/2001 | Blair et al. | |
| 6,192,407 B1 * | 2/2001 | Smith et al. | 709/229 |
| 6,266,692 B1 * | 7/2001 | Greenstein | 709/206 |
| 6,360,254 B1 | 3/2002 | Linden et al. | |
| 6,460,141 B1 | 10/2002 | Olden | |
| 6,463,533 B1 | 10/2002 | Calamera et al. | |
| 6,496,931 B1 | 12/2002 | Rajchel et al. | |
| 6,535,586 B1 | 3/2003 | Cloutier et al. | |
| 6,591,291 B1 | 7/2003 | Gabber et al. | |
| 6,606,708 B1 | 8/2003 | Devine et al. | |
| 6,615,348 B1 * | 9/2003 | Gibbs | 713/162 |
| 6,640,301 B1 * | 10/2003 | Ng | 713/156 |

(Continued)

FOREIGN PATENT DOCUMENTS

GB    2418330    3/2006

OTHER PUBLICATIONS

Kaushik et al., A policy driven approach to email services, Jun. 2004, Proceedings of the Fifth IEEE International Workshop on Policies for Distributed Systems and Networks, pp. 169-178.*

(Continued)

*Primary Examiner* — Taghi Arani
*Assistant Examiner* — Kenneth Chang
(74) *Attorney, Agent, or Firm* — Lee & Hayes, PLLC

(57) ABSTRACT

E-mail based user authentication is described herein. A user can access resources of a service provider by submitting only an e-mail address to which the user has access. The service provider generates an authentication ticket corresponding to the user's login request, and transmits the authentication ticket to the e-mail service provider indicated by the submitted e-mail address. The e-mail service provider processes the authentication ticket, and enables either approval or denial of the authentication ticket, whether by explicit user action or by automated processing.

16 Claims, 5 Drawing Sheets

(56) References Cited

U.S. PATENT DOCUMENTS

| | | |
|---|---|---|
| 6,725,269 B1 | 4/2004 | Megiddo |
| 6,895,558 B1 | 5/2005 | Loveland |
| 7,003,661 B2 | 2/2006 | Beattie et al. |
| 7,054,906 B2 | 5/2006 | Levosky |
| 2002/0073343 A1 | 6/2002 | Ziskind et al. |
| 2002/0087649 A1 | 7/2002 | Horvitz |
| 2002/0156905 A1 | 10/2002 | Weissman |
| 2003/0126259 A1 | 7/2003 | Yoshida et al. |
| 2003/0163423 A1* | 8/2003 | Holst-Roness ............... 705/40 |
| 2003/0163691 A1 | 8/2003 | Johnson |
| 2003/0182383 A1 | 9/2003 | He |
| 2003/0194968 A1* | 10/2003 | Young ............................ 455/45 |
| 2004/0034631 A1* | 2/2004 | Julliard et al. .................... 707/4 |
| 2004/0049538 A1* | 3/2004 | Akamatsu et al. ............ 709/203 |
| 2004/0054741 A1* | 3/2004 | Weatherby et al. ........... 709/206 |
| 2004/0088357 A1 | 5/2004 | Harding |
| 2004/0103203 A1* | 5/2004 | Nichols et al. ................ 709/229 |
| 2004/0226992 A1* | 11/2004 | Imanishi ...................... 235/379 |
| 2005/0114453 A1 | 5/2005 | Hardt |
| 2005/0172229 A1* | 8/2005 | Reno et al. .................... 715/700 |
| 2005/0188008 A1 | 8/2005 | Weissman |
| 2005/0193211 A1 | 9/2005 | Kurose |
| 2005/0204011 A1 | 9/2005 | Velayudham |
| 2005/0210296 A1 | 9/2005 | Devine et al. |
| 2005/0266798 A1* | 12/2005 | Moloney et al. ............. 455/41.2 |
| 2005/0273843 A1 | 12/2005 | Shigeeda |
| 2006/0026438 A1 | 2/2006 | Stern et al. |
| 2006/0036740 A1* | 2/2006 | Hagale et al. ................ 709/227 |
| 2006/0048212 A1 | 3/2006 | Tsuruoka et al. |

OTHER PUBLICATIONS

Adida, et al., "Fighting Phishing Attacks: A Lightweight Trust Architecture for Detecting Spoofed Emails" Available at http://theory.lcs.mit.edu/~rivest/AdidaHohenbergerRivest-FightingPhishingAttacks.pdf, Feb. 2005.

Garfinkel, "Email-based identification and authentication: an alternative to PKI?" IEEE Security & Privacy, Nov. 2003, pp. 20-26, vol. 1 issue 6.

Gieben, "Chain of Trust the parent-child and keyholder-keysigner relations and their communication in DNSSEC" Available at http://www.miek.nl/publications/thesis/CSI-report.pdf, Jun. 2001.

Tiamaigh, "Adaptive Moodle" Available at https://www.cs.tcd.ie/courses/csll/tiarnaigh0405.pdf, May 2005.

* cited by examiner

E-MAIL BASED USER AUTHENTICATION

RELATED APPLICATIONS

This application is a continuation of, and claims priority to, U.S. patent application Ser. No. 11/275,429, titled "E-Mail Based User Authentication," filed on Dec. 30, 2005, and is hereby incorporated by reference.

BACKGROUND

Many websites available on the internet may ask visitors to register or otherwise establish an account in order to access some or all of the content or services offered by the websites. As a given user visits a variety of different sites, he or she may be asked to register at numerous different sites. If the user wishes to register under his or her own name, the user may find that a preferred name is already taken at one or more given sites. Thus, a user named "John Doe" may have to register under "John Doe1" at one site, under "John Doe11" at another site, under "J_Doe" at a third site, and so on. These different user names may prove burdensome for users to remember, and may be forgotten over time. Accordingly, some users may choose to maintain a written or recorded list of the usernames under which they are registered at different websites.

Another complication is that different websites may implement different password policies, in terms of overall length, complexity, and alphanumeric composition. Thus, if a user has a favorite password, this favorite password may be acceptable to some websites, but not acceptable to others. Thus, the user may have to create and remember a variety of different passwords to comply with password polices in effect at different sites. Once again, these different passwords may prove difficult to remember, and users may record them to avoid relying entirely on memory.

Users may also consider the content or subject matter of a given website when choosing a user name under which to register. For a variety of reasons, the users may wish to register under a relatively anonymous user name. Thus, John Doe, from the example above, may wish to sign on to a discussion forum under the name "User A" to preserve his privacy. Because these anonymous user names may also be difficult to remember over time, users may either forget their anonymous user names, or choose to record them for later reference.

SUMMARY

Systems and/or methods ("tools") are described that enable e-mail based user authentication. A user can access resources of a service provider by submitting only an e-mail address to which the user has access. The service provider generates an authentication ticket corresponding to the user's login request, and transmits the authentication ticket to the e-mail service provider indicated by the submitted e-mail address. The e-mail service provider processes the authentication ticket, and allows only the user indicated by the submitted e-mail address access to the authentication ticket, thus enabling that specific user access to the service provider's resources. During this authentication process, the approval or denial of the authentication ticket can either be automated or by explicit user action.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTIONS OF THE DRAWINGS

The same numbers are used throughout the disclosure and FIG.s to reference like components and features.

DETAILED DESCRIPTION

Overview

The following document describes system(s) and/or method(s) ("tools") capable of many techniques and processes. The following discussion describes exemplary ways in which the tools enable e-mail based user authentication. This discussion also describes ways in which the tools perform other techniques as well.

This document is organized into sections for convenience, with the sections introduced by headings chosen for convenience, but not limitation. First, an illustrative Operating Environment for performing e-mail based user authentication is described. Then, illustrative Data Structures are described, followed by illustrative Process Flows.

Operating Environment

Before describing the tools in detail, the following discussion of an exemplary operating environment is provided to assist the reader in understanding one way in which various aspects of the tools may be employed. The environment described below constitutes but one example and is not intended to limit application of the tools to any one particular operating environment. Other environments may be used without departing from the spirit and scope of the claimed subject matter.

Figure 1:
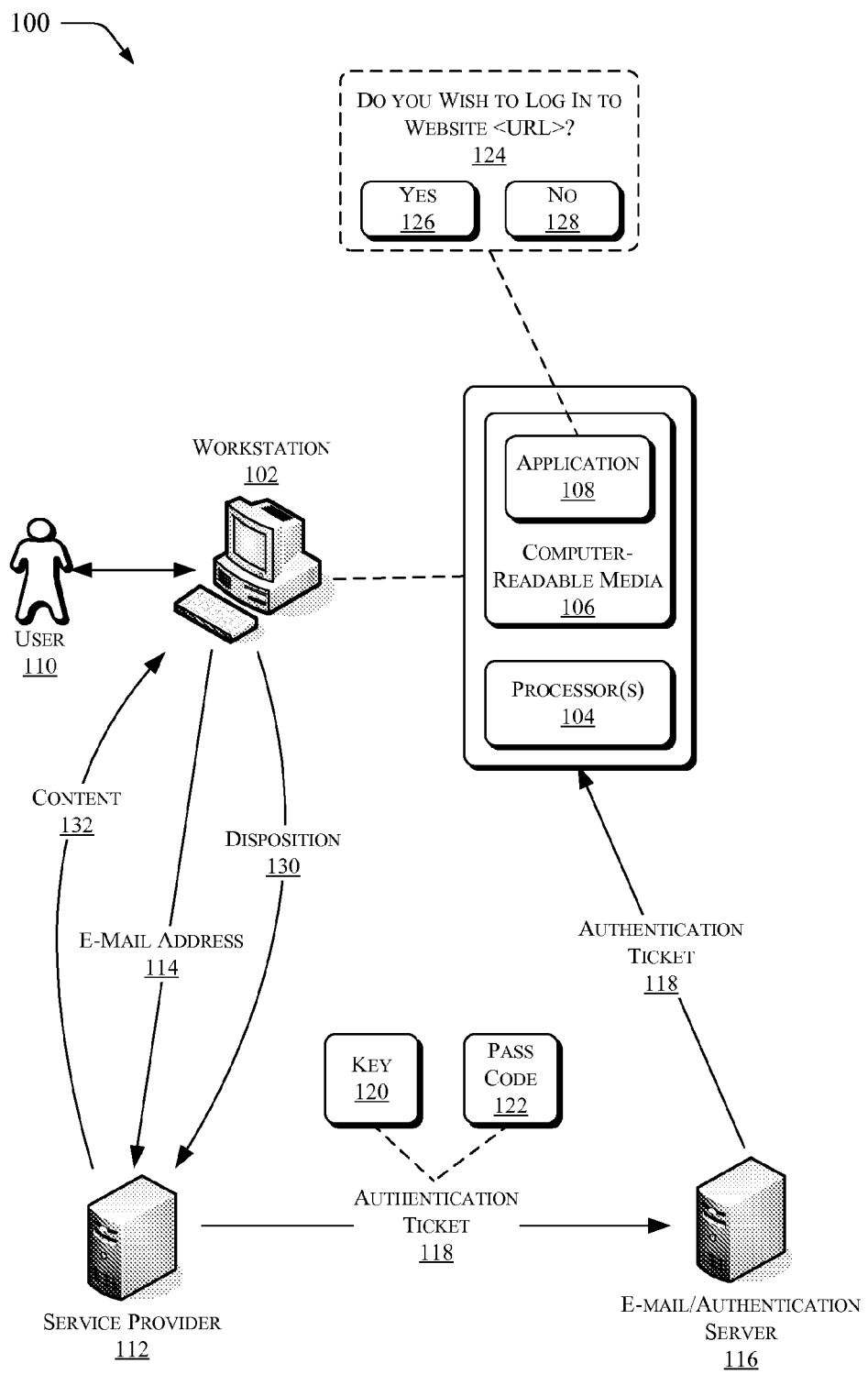
FIG. 1 is a combined block and data flow diagram of an operating environment for performing e-mail based user authentication.

FIG. 1 illustrates one such operating environment for performing e-mail based user authentication, generally at 100. The operating environment 100 can comprise a workstation 102 having one or more processor(s) 104 and computer-readable media 106. The workstation 102 can comprise a computing device, such as a cell phone, desktop computer, personal digital assistant, server, or the like. The processor 104 can be configured to access and/or execute the computer-readable media 106. The computer-readable media 106 can comprise or have access to an application 108, which may be implemented as a module, program, or other entity capable of interacting with a network-enabled entity. The application 108 may take the form of a browser such as, for example, the Internet Explorer® web browser available from Microsoft Corporation of Redmond, Wash. The application 108 may also take the form of an e-mail client, such as, for example, the Outlook® or Outlook Express® e-mail application or web-based email such as the Hotmail® service, also available from Microsoft. It is understood that the applications 108 may take forms other than the specific examples given above.

A user 110 may interact with the application 108 to request access to content or services offered by, published by, or otherwise associated with a service provider 112. For example, the service provider 112 may be a website accessible to a plurality of users 110 over a network (not shown), such as the Internet. Non-limiting examples of such a website can include a retail website offering goods or service for on-line purchase by the users 110, an on-line discussion forum relating to goods or services of interest to some segment of the users 110, a website listing real estate or other properties for sale, or the like.

Typically, to access at least some content or services offered by the service provider 112, the user 110 can log in to the service provider 112. In the context of the operating environment 100, the user 110 can request access to the service provider 112 by providing his or her e-mail address 114. The e-mail address 114 may be considered an authentication request, for the purposes of this description. It is assumed that the user 110 has an e-mail address and related account with an e-mail or Internet service provider (ISP), which is represented in FIG. 1 by e-mail server 116.

Returning to the service provider 112, having received the user's e-mail address 114, the service provider 112 can authenticate the user 110 by passing an authentication ticket 118 to the e-mail server 116. More specifically, the authentication ticket 118 can be directed to a user name extracted from the e-mail address 114. For example, assume that the user 110 provides an e-mail address 114 in the form of "john.doe@hotmail.com". The e-mail server 116 in this example would be identified by "hotmail.com", and the e-mail server 116 would direct the authentication ticket 118 to the username "john.doe" on this ISP.

The authentication ticket 118 can include, for example, a key 120 and a pass code 122. The service provider 112 can create a unique instance of the key 120 and the pass code 122 for each authentication request (114) received from the users 110. The key 120 may be, for example, a GUID (globally unique ID) or a hash which uniquely identifies the authentication ticket. The pass code 122 is paired with each key 120, and assuming that the user 110 is properly authenticated to the e-mail/authentication server 116 in the operating environment 100, the ticket 122 is eventually retrieved by the user 110 and returned to the service provider 112, as described in further detail below.

The e-mail server 116 can receive the authentication ticket 118, with the related key 120 and pass code 122 embedded in it. Assuming that the e-mail address 114 is valid on the e-mail server 116, the e-mail server 116 can then forward the authentication ticket 118 to the user name indicated in the e-mail address 114. The authentication ticket 118 can be transmitted in the form of, for example, an e-mail message or an XML message over HTTP/HTTPS or an instant message (IM) directed to the user name that was extracted from the input e-mail address 114. Thus, the authentication ticket 118 can be made available to a user 110 on, for example, the workstation 102, using the application 108. This authentication ticket delivery process can be initiated either by the server 116 or by the user 110, depending on whether a push or pull model is employed.

Assume that a given user 110 has requested access to the service provider 112, and has submitted the e-mail address/authentication request 114 in connection with that request, as discussed above. Assume further that this user 110 also has access to messages sent to the e-mail address 114, and is logged in his e-mail account at the workstation 102 when he provides his e-mail address 114 to the service provider 112. The user 110 can be presented with a user interface 124 that is displayed on the workstation 102, in response to receiving the authentication ticket 118. As described further below, some implementations of the operating environment 100 may not include the user interface 124. Thus, the block representing the user interface 124 in FIG. 1 is shown in dashed outline to convey its optional status. Generally herein, for convenience only, dashed outlines in the drawing FIG.s suggest that the corresponding features may be considered optional in some implementations. However, this convention does not mean that other features are to be considered mandatory in nature.

The user interface 124 can include text, such as that shown in FIG. 1, asking whether the user 110 wishes to access resources associated with a particular service provider 112. For example, the user interface 124 may prompt the user 110 whether he or she wishes to log in to a particular website having a given URL. The user interface 124 may include a "Yes" field 126 that is responsive to user input to indicate that the user 110 wishes to grant the authentication ticket 118, and a "No" field 128 that is responsive to user input to indicate that the user 110 wishes to deny the authentication ticket 118.

If a given user 110 submits the e-mail address 114 in connection with a request to access the service provider 112, and also has access to the e-mail address 114, then this user 110 will see the user interface 124 appear on the workstation 102 shortly after submitting the request to access the service provider 112. This same user 110 can click the "Yes" field 126, indicating approval of the authentication ticket 118. Recall that the authentication ticket 118 as sent by the e-mail server 116 can include the key 120 and the pass code 122. In response to a click on the "Yes" field 126, the application 108 presenting the user interface 124 can extract the key 120 the pass code 122 from the authentication ticket 118, and forward the key 120 pass code 122 to the service provider 112. The data sent from the application 108 to the service provider 112 is represented generally as disposition data 130.

Recall further that the service provider 112 generated the key 120 and pass code 122 when previously sending the authentication ticket 118 to the e-mail server 116. In some implementations, the service provider 112 can store this key 120/pass code 122 pair for later reference.

To authenticate a given user, the service provider 112 can compare a key 120 and pass code 122 that are received from the application 108 to the key 120 and pass code 122 that were transmitted as part of the authentication ticket 118. If the pass code 122 and key 120 as received from the application 108 correspond to the ticket 118 that was sent previously in connection with the authentication request 114, then the service provider 112 can be reasonably certain that the user 110 is authenticated by the e-mail server. Therefore, the service provider 112 can log the user 110 in, and allow the user 110 to access the resources or content of the service provider 112. These resources or content are represented generally in FIG. 1 by content 132, which may be web pages and/or cookies, for example.

In some implementations, when defining the authentication ticket 118 with related key 120 and/or pass code 122, the service provider 112 can specify a time limit or expiration period associated with the ticket 118. If the ticket 118 is defined with a time limit, then the ticket can be treated as invalid after that time limit expires. The service provider 112 can be adapted not to accept the authentication ticket 118 from the user 110 after this period expires, even if the ticket is otherwise valid and is returned to the service provider 112 as otherwise described herein. The duration of this time interval can be chosen, for example, based on security considerations or based on the performance of the network connecting the service provider 112, the user 110, and the e-mail server 116. The protocols chosen for implementing the communications among the service provider 112, the user 110, and the e-mail server 116 may also be factors in defining the time interval.

The foregoing description assumes that the same user 110 requested access to the service provider 112, and also had access to messages sent to the e-mail address 114. Thus, the user 110 could be authenticated to access the service provider 112, because he or she received and responded to the authentication ticket 118 via the e-mail address 114 and/or the e-mail server 116.

In other instances, the user 110 may not have access to the e-mail address 114, or may fail to respond to the user interface 124 in a timely manner. For example, the user 110 may innocently provide the wrong e-mail address 114, or may willfully provide an invalid e-mail address 114 in an effort to access the service provider 112 under someone else's name. More particularly, assume that a user 110 named "John Doe" wishes to access a given website having a URL <badsite.com>, and that the badsite.com website implements the operating environment 100. To access badsite.com, John Doe provides an e-mail address 114 in the form of "Jane Smith@hotmail.com". However, John Doe does not know Jane Smith, and is not authorized to access Jane Smith's e-mail account. Nevertheless, John tries Jane's e-mail, just in case it might work. In this example, the authentication ticket 118 is sent to Jane's e-mail account. In response to the authentication ticket 118, a user interface 124 may or may not be displayed by an application 108 on Jane Smith's workstation 102.

As discussed above, the user interface 124 may ask Jane if she wishes to log into badsite.com. In some implementations, assuming that the authentication ticket 118 indicates the name of the website, the user interface 124 may indicate that Jane Smith is requesting permission to access badsite.com via Jane's e-mail address 114. If Jane is logged into her e-mail account, she may see the user interface 124. If she has not submitted a request to access badsite.com, she can click on the "No" field 128 of the user interface 124 to reject John Doe's access request.

Continuing with this example, assume that the badsite.com website defines a time limit for the key 120/pass code 122 generated for John's authentication ticket 118. If Jane is not at her workstation 102 or is not logged in to the application 108 when the authentication ticket 118 arrives, she will most likely not see the user interface 124 before the time limit expires. Thus, she will not approve the authentication ticket 118 in time, and the ticket 118 will expire. Even if the ticket 118 is later sent to the service provider 112, the ticket 118 will have expired, and John's authentication request, corresponding to his submitted e-mail address 114, is denied.

It is understood that in the above example, Jane could also accidentally approve John's authentication ticket 118 in the case where the implementation calls for the log-in UI 124. In this case, she would click the "Yes" field 126 in a timely manner, and the pass code 120 would be sent to the service provider 112, as discussed above. Jane would then gain access to the service provider's 112 resources, not John who initiated the request. Other implementations may not include the UI 124. In such cases, (i.e., those implementations without the UI 124), the authentication ticket 118 initiated by John's log-in request would simply expire because: (1) John is denied access when he tries to retrieve the ticket 118, and/or (2) Jane never see the UI 124 and thus does not retrieve the ticket 118.

Having provided the above description of the operating environment 100, several observations are now noted. The operating environment 100 enables the e-mail server 116 to become an authentication server for the service provider 112. More particularly, the operating environment 100 enables the service provider 112 to log-in the users 110 by leveraging pre-existing, authenticated relationships between the users 110 and their respective e-mail servers 116. In addition, the users 110 can log-in to the service provider 112 using only an e-mail address, and need not provide any password to the service provider 112.

Additionally, the user 110 can log in to the service provider 112 without previously establishing a username-password combination with the service provider 112, or establishing any other ongoing relationship or registration with the service provider 112. Also, the user 110 need not provide a username-password combination to the service provider 112 when logging in. Instead, the user 110 provides only the e-mail address 114 to the service provider 112. While the user 110 may provide a username-password combination to access the e-mail server 116 in order to receive and respond to the authentication ticket 118, this is distinguished from providing such a username-password combination to the service provider 112. Accordingly, the operating environment 100 relieves the user 110 from having to remember a multitude of different username-password combinations under which the user 110 logs in to various service providers 112. Instead, the user 110 need only remember his or her e-mail address to access a plurality of different service providers 112.

It is also noted that the user 110 may choose to define a plurality of different e-mail addresses 114, and then choose which e-mail address 114 to use when logging in to different service providers 112. For example, the user 110 may assign a different level of trust or care to each of his or her different e-mail addresses 114, and may factor that into account when accessing the different service providers 112. Additionally, the user 110 may compose the e-mail addresses 114 differently, depending on the context or the environment of the different service providers 112 that the user 110 intends to visit using the e-mail addresses 114. For example, if the user 110 anticipates visiting hacker discussion forums, the user 110 might define an anonymous e-mail address 114, such as UserA@hotmail.com, for use in such forums.

Data Structures

The tools described and illustrated herein may utilize data structures as part of their implementation and/or operations to perform e-mail based user authentication. Examples of such data structures are now described.

Figure 2:
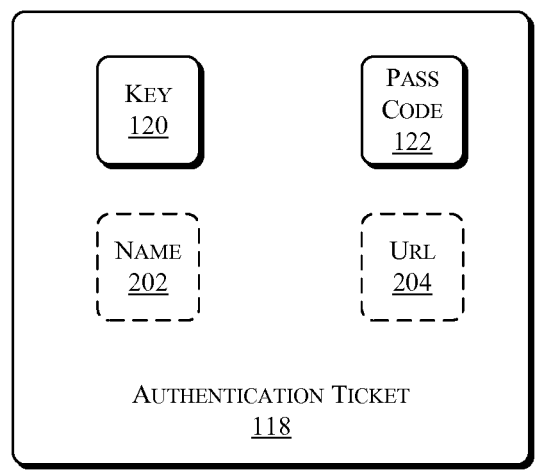
FIG. 2 is a block diagram of a data structure that may be suitable for implementing an authentication request as shown in FIG. 1.

FIG. 2 illustrates a data structure 200 that may be suitable for implementing the authentication ticket 118. As noted above, the authentication ticket 118 can reference a key 120 and/or pass code 122. Thus, the data structure 200 can contain fields 120 and 122 for these values. In addition, however, some implementations of the authentication ticket 118 can reference the name or other identification of the user 110 who requesting access to the service provider 112. The authentication ticket 118 could also reference a URL or other identification of the service provider 112 or website to which the user 110 is requesting access. Accordingly, some implementations of the data structure 200 can include a field 202 for the identification of the user 110, and a field 204 for the identification of the service provider 112 or website. Both of the fields 202 and 204 are shown in FIG. 2 in dashed outline, for convenience only.

The data structure 200 can enable the user interface 124 to be tailored to each particular authentication ticket 118, so that the user 110 being asked to approve or deny the authentication ticket 118 can do so in a more informed manner. More specifically, the application 108 may extract the contents of the fields 202 and 204 when populating the user interface 124 for presentation to the user 110.

Having described the foregoing examples of the fields 120, 122, 202 and 204, it is understood that various implementations of the data structure 200 could include one or more of these example fields 120, 122, 202 and 204, or may contain additional data, fields, or sub-fields other than those illustrated in FIG. 2. In addition, the layout, names, and configuration of the fields or sub-fields of the data structure 200 are illustrative only, and are chosen only for convenience of illustration and description, and do not limit possible implementations of the data structure 200. It is further understood that given instances of the data structure 200 may be associated with the authentication tickets 118, but each instance of the data structure 200 need not have populated each field and/or sub-field as shown in FIG. 2.

Process Flows

The tools as described herein can implement various process flows to perform e-mail based user authentication. Examples of such process flows are now described.

Figure 3:
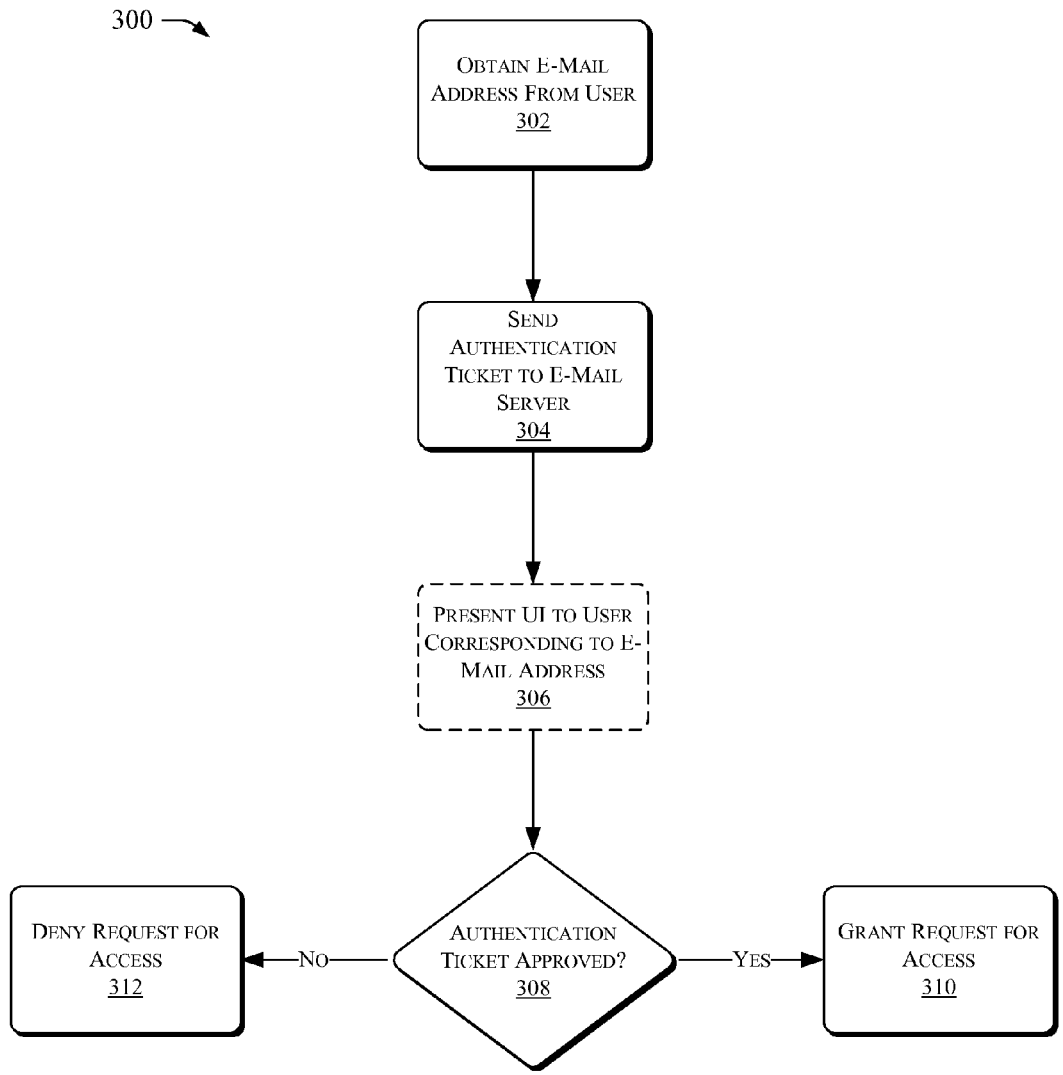
FIG. 3 is a flowchart of an overall process flow for performing e-mail based user authentication.

FIG. 3 illustrates an overall process flow 300 that may be performed to conduct e-mail based user authentication. For convenience and ease of discussion, the process flow 300 is described here in connection with certain aspects of the operating environment 100. However, it is understood that the process flow 300 may be implemented on devices or components other than those shown in the operating environment 100 without departing from the spirit and scope of the description herein.

Block 302 obtains an e-mail address 114 from the user 110, in connection with the user's request to access resources associated with a service provider 112. Block 304 sends the authentication ticket 118 to the user as indicated by the input e-mail address 114 via the corresponding e-mail server 116 to authenticate the user 110. Block 306 presents a user interface 124 to a user 110 as indicated by the input e-mail address 114. Block 306 can enable the user 110, to whom the authentication ticket 118 was sent, to approve or deny the authentication ticket 118, by clicking or otherwise interacting with the user interface 124. In implementations that do not include the user interface 124, a counterpart to block 306 could be performed automatically by a client process running on the workstation 102.

Block 308 tests whether the authentication ticket 118 was approved. In some implementations, block 308 can test whether the user 110 seeking access to the service provider 112 is the same as the user 110 to whom the authentication ticket 118 was sent. In other implementation, these two users 110 may not be the same, but the user 110 receiving the authentication ticket 118 may nevertheless approve the authentication ticket 118, allowing access to the service provider 112. In any event, if the authentication ticket 118 was approved, block 310 grants the user specified by the e-mail address 114 login or other access to the service provider 112.

Returning to block 308, if the authentication ticket 118 is expressly denied, or if the authentication ticket 118 is not approved in a timely manner, then block 312 denies the user 110 access to the service provider 112. Recall that the service provider 112 can establish a time limit within which the authentication ticket 118 is to be approved. If the time limit expires before the authentication request 118 is approved, any pass code 122 or other such item associated with authentication request 118 can expire and not serve as a basis for authenticating the user 110.

Figure 4:
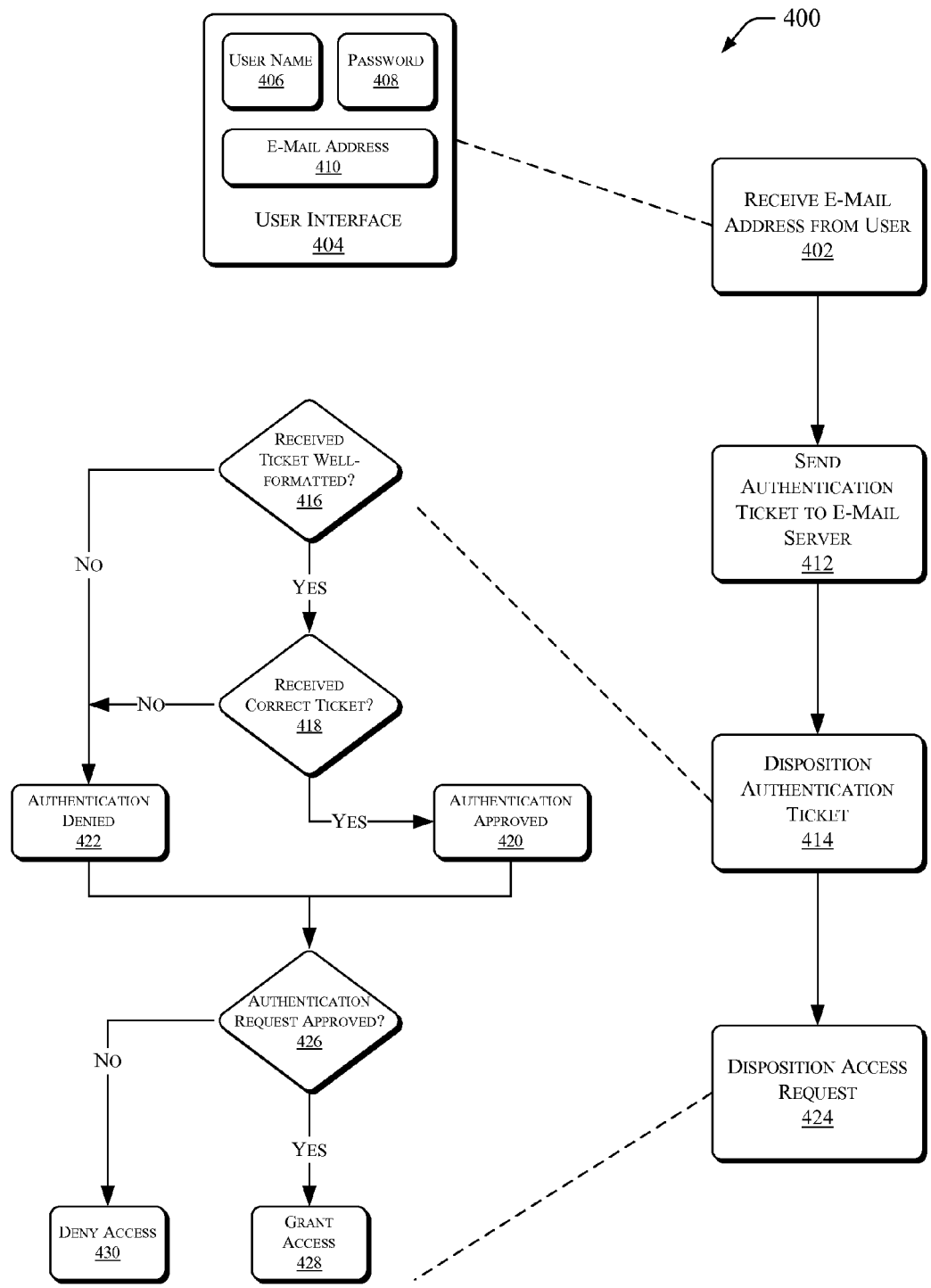
FIG. 4 is a flowchart of a process flow that may be executed by a service provider in performing e-mail based user authentication.

FIG. 4 illustrates a process flow 400 for performing e-mail based user authentication. While the process flow 400 is described herein in connection with tools such as the service provider 112, the process flow 400 could also be implemented by or with other tools without departing from the spirit and scope of the description herein.

Block 402 receives the e-mail address 114 from the user 110, in connection with a request from the user 110 to access the service provider 112. To obtain the e-mail address 114 from the user 110, the service provider 112 might present a user interface 404, as shown also in FIG. 4.

In some implementations, the user interface 404 may support e-mail based user authentication and username-password login, allowing the user 110 to choose which login method to use. Accordingly, the example user interface 404 shown in FIG. 4 includes a field 406 for a username, a field 408 for a password, and a field 410 for an e-mail address. If the user 110 enters data into the field 410, the fields 406 and 408 may be grayed-out so as not to accept user input. However, in other implementations, the user interface 404 can be configured to support only e-mail based user authentication. In this implementation, fields 406 and 408 may be deleted entirely.

In another implementation, block 402 can recognize that a user 110 wishes to perform e-mail based authentication by testing for input into field 406 for any occurrence of the "@" symbol entered. In this case, field 410 can be omitted from the user interface 404.

Block 412 sends an authentication ticket 118 to an e-mail server 116, which is identified based on the input e-mail address 114. As discussed above, the contents of the data structure 200, at least in part, can be used in connection with the authentication ticket 118.

Block 414 dispositions the authentication ticket 118. More particularly, block 416 can test whether a data element such as the pass code 122 was received by the service provider 112. Block 416 can also check whether the received ticket 118 was well-formatted, i.e., free from any corruption or violation that may have occurred during transmission. In addition, recall that some implementations of the ticket 118, and related elements such as the key 120 and the pass code 122, can expire after some interval of time. In such implementations, block 416 can check whether the ticket 118 was received before it expired. If yes, then block 418 can test whether the correct pass code 122 and key 120 was received. If yes from block 418, then block 420 approves the authentication ticket 118.

From block 418 or block 416, if the "no" branch is taken, then block 422 denies the authentication ticket 118.

Block 424 dispositions the request from the user 110 to access the service provider 112, based on how the authentication ticket 118 was dispositioned in block 414 (e.g., via blocks 416-422). For example, block 426 can test how the authentication ticket 118 was dispositioned. If the authentication ticket 118 was approved, then block 424 can grant the user 110 access to the resources provided by the service provider 112. Otherwise, block 430 can deny the user 110 access to the resources provided by the service provider 112.

Figure 5:
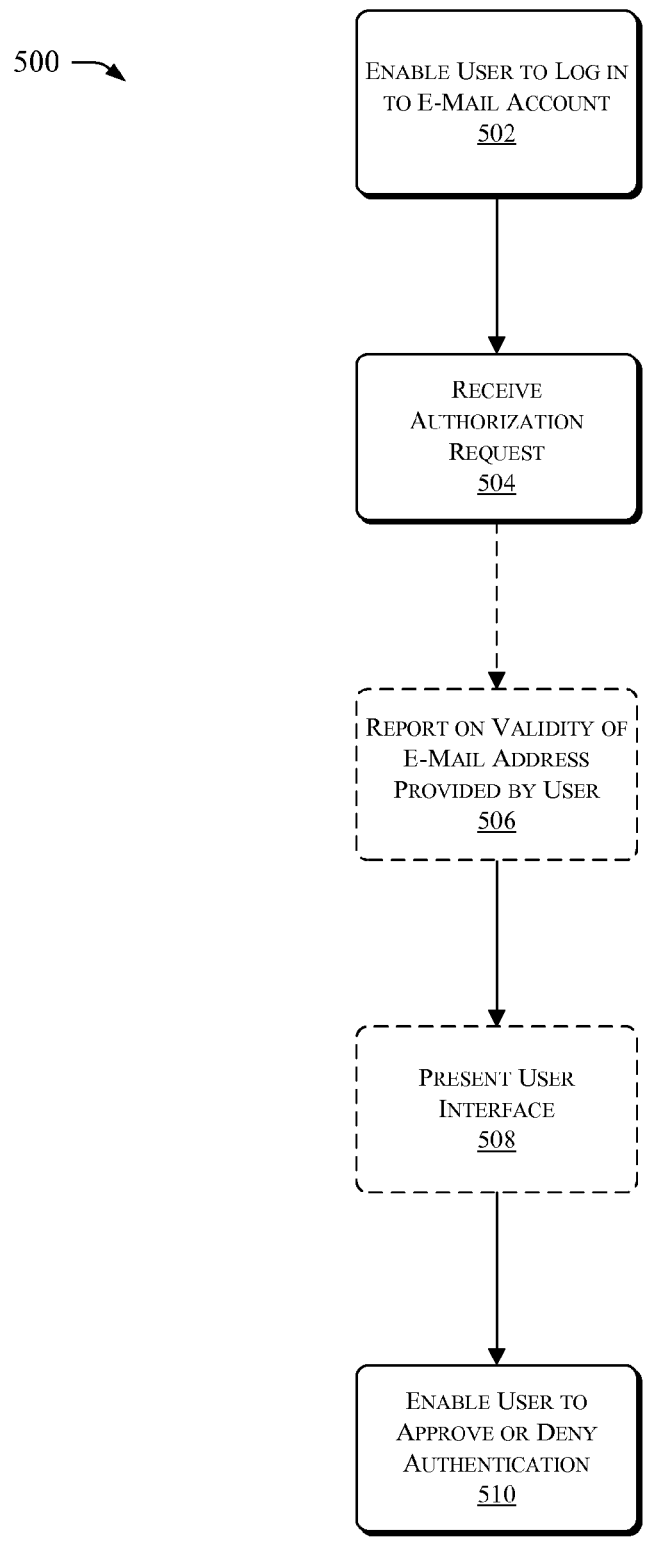
FIG. 5 is a flowchart of a process flow that may be executed by an e-mail server in performing e-mail based user authentication.

FIG. 5 illustrates a process flow 500 for performing e-mail based user authentication. While the process flow 500 is described herein in connection with tools such as the e-mail server 116, the process flow 500 could also be implemented by or with other tools without departing from the spirit and scope of the description herein.

Block 502 enables a user 110 to log into the e-mail server 116 so as to access any incoming messages addressed to the user 110. Recall that the authentication ticket 118 can be routed to the e-mail address 114 provided by a user 110 who is requesting access to the service provider 112. Recall also that the ticket 118, and/or related elements such as the key 120 and pass code 122, as issued by the service provider 112 may be valid only for a limited period of time. Thus, it may be advisable for the user 110 to be logged-in with his or her e-mail server 116 when he or she submits a request to access the service provider 112 using e-mail based user authentication.

Block 504 receives the authentication ticket 118, which may be sent by, for example, the service provider 112. Block 506 validates the contained e-mail address 114 provided by the user 110. If the user name in the input e-mail address 114 does not exist in the domain of the e-mail server 116, then the e-mail server 116 can choose to report or not report this error condition back to the service provider 112 based on the e-mail provider's policies. In such an implementation, the authentication ticket 118 is not forwarded to the user's 110 email server 116, because such user 110 does not exist on the e-mail server 116. This condition would result in denying the authentication ticket 118, with an appropriate message being provided to the user 110. Block 506 is shown in dashed outline because it may be considered an optional error check. Some implementations of the process flow 500 may instead transmit the authentication ticket 118 without first error-checking the e-mail address 114.

Block 508 presents a user interface, such as the user interface 124 shown in FIG. 1, to the user 110 who logged into the e-mail server 116 in block 502. This user interface 124 presents data related to the authentication ticket 118, and may operate in connection with a data structure such as the data structure 200. Block 508 is shown in dashed outline to suggest its optional status. In some implementations, the ticket 118 may be approved by a client or browser on the workstation 102 that is active when the user 110 is logged in to his or her e-mail account. Block 510 enables the user 110 or the client to approve or deny the authentication ticket 118.

Having provided the foregoing description, the following further observations are noted. The message flows between the workstation 102 and the service provider 112 can be implemented using, for example, the Hypertext Transfer Protocol (HTTP). The message flows between the e-mail server 116 and the service provider 112, as well as the message flows between the e-mail server 116 and the workstation 102, can be implemented using, for example, the Hypertext Transfer Protocol (HTTP), the Simple Mail Transfer Protocol (SMTP) or the Extensible Messaging and Presence Protocol (XMPP).

It is noted that some implementations of SMTP may not guarantee delivery of messages within a given time interval. Recall that the authentication ticket 118 and the ticket 122 may be valid only for a limited time. Accordingly, some implementations of the operating environment 100 may extend SMTP to provide header-level information for any messages relating to e-mail based user authentication, such as the authentication ticket 118, for example. This header-level information may be processed so as to give additional priority to those messages relating to e-mail based user authentication, to enable the authentication ticket 118 to be acted upon before it expires.

In those implementations of the application 108 that take the form of browser software, the browser may be adapted with a light or thin instant-message (IM) client. This IM client may enable the operating environment 100 to execute with quality of service (QoS) guarantees sufficient to prevent expiration of authentication ticket 118 due to message transmission or protocol errors. Additionally, for added security, messages passed within the operating environment 100 may be encrypted using key pairs or the Secure Sockets Layer (SSL) protocol.

In some implementations of the application 108 that take the form of browser software, the browser may be adapted to proactively recognize that the user 110 is using e-mail based authentication. In this case, the browser may extract the e-mail address 114 provided by the user 110, and determine which e-mail server 116 is associated with that e-mail address 114. The browser may then poll the e-mail server 116 once every time interval, for example once every second for about 5-6 seconds, asking the e-mail server 116 for the authentication ticket 118. If the user 110 is logged into the e-mail server 116 using the workstation 102 on which the browser is executing, then the browser can communicate with the e-mail server 116. When the browser receives the authentication ticket 118, the browser can forward it to the service provider 112. This implementation relieves the user 110 from any e-mail or IM interactions with the user interface 124, thereby automating the process to some degree, in exchange for a more complex and sophisticated browser.

It is also noted that typical e-mail servers may be configured to communicate primarily via an e-mail port. Accordingly, in some implementations of the operating environment 100, the e-mail server 116 may be configured with one or more additional, non-e-mail ports, so as to communicate with components such as the service provider 112.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain flow diagrams described and illustrated herein, it is noted that the processes and sub-processes depicted therein may be performed in orders other than those illustrated without departing from the spirit and scope of the description herein.

The invention claimed is:

1. A method comprising:
   receiving, at an e-mail server, a Simple Mail Transfer Protocol (SMTP) message that includes header-level information that identifies the SMTP message as a message relating to e-mail based user authentication, wherein the SMTP message includes an authentication ticket from a third-party service provider, and wherein the authentication ticket is received in response to an access request relating to resources of the third-party service provider;
   processing, at the e-mail server, the header-level information to give the message relating to e-mail based user authentication additional priority compared to an e-mail message received at the e-mail server, to cause the authentication ticket to be acted upon prior to an end of an expiration period associated with the authentication ticket; and
   forwarding the authentication ticket from the e-mail server to a user name associated with an e-mail address included in the access request, the authentication ticket including an identification of the third-party service provider that is to be presented to a user via a user interface after the user has logged into an e-mail account associated with the e-mail address via the e-mail server, wherein the user interface allows the user to either grant permission to send the authentication ticket to the third-party service provider or deny permission to send the authentication ticket to the third-party service provider.

2. The method of claim 1, wherein the authentication ticket is transmitted from the e-mail server as an e-mail message to the e-mail address included in the access request.

3. The method of claim 1, wherein the authentication ticket is transmitted from the e-mail server as an instant message to the user name associated with the e-mail address included in the access request.

4. A method comprising:
receiving, from a computing device, an e-mail address in connection with a request to access resources of a service provider;
identifying a third party e-mail server associated with the e-mail address;
sending an electronic message to the third party e-mail server, wherein the electronic message includes:
header-level information that identifies the electronic message as a message relating to e-mail based user authentication, the header-level information to be processed by the third party e-mail server to give the message relating to e-mail based user authentication additional priority compared to an e-mail message received at the third party e-mail server; and
an authentication ticket, the authentication ticket to be forwarded from the third party e-mail server to the computing device after the third party e-mail server has received one or more authentication credentials required to log into an e-mail account associated with the e-mail address;
receiving disposition data from the computing device, wherein the disposition data does not include the one or more authentication credentials submitted to the third party e-mail server to log into the e-mail account;
dispositioning the authentication ticket based on the disposition data received from the computing device; and
dispositioning the request based upon at least the disposition of the authentication ticket, wherein:
the request is denied when the authentication ticket is not approved within a predefined time interval; and
the request is granted when the authentication ticket is approved within the predefined time interval.

5. The method of claim 4, wherein the e-mail address is received in connection with a request to login to a website associated with the service provider.

6. The method of claim 4, wherein the authentication ticket comprises a key and a pass code.

7. The method of claim 6, wherein the disposition data received from the computing device includes an additional key and an additional pass code.

8. The method of claim 7, wherein the authentication ticket is approved when the additional key matches the key included in the authentication ticket and the additional pass code matches the pass code included in the authentication ticket.

9. The method of claim 4, wherein the dispositioning the request is performed without receiving a password from the computing device.

10. The method of claim 4, wherein the e-mail address is received via a user interface presented by the service provider.

11. The method of claim 10, wherein the user interface includes a username field, a password field, and an e-mail address field, and wherein the username field and the password field are grayed-out so as not to accept user input in response to receiving user input into the e-mail address field.

12. The method of claim 6, wherein the key is a globally unique identifier (GUID) or a hash that is generated in response to receiving the e-mail address in connection with the request.

13. The method of claim 4, wherein the predefined time interval is determined based on one or more security considerations, network performance, or a combination thereof.

14. A method comprising:
submitting one or more authentication credentials to an e-mail server to log into an e-mail account associated with an e-mail address;
receiving, via a web browser, a request for access to resources of a service provider, wherein the request includes the e-mail address but does not include the one or more authentication credentials submitted to the e-mail server to log into the e-mail account;
polling the e-mail server about every second for about five seconds by querying the e-mail server for an authentication ticket generated by the service provider; and
automatically forwarding disposition data that includes the authentication ticket received from the e-mail server to the service provider for disposition of the request for access to resources of the service provider, wherein:
the disposition data does not include the one or more authentication credentials submitted to the e-mail server to log into the e-mail account;
at least a portion of the authentication ticket is sent as header-level information to the service provider; and
the service provider processes the at least a portion of the authentication ticket sent as header-level information with a higher priority than an e-mail message, to cause the authentication ticket to be acted upon prior to an end of an expiration period associated with the authentication ticket.

15. The method of claim 14, wherein the request is received via a web browser.

16. The method of claim 14, wherein the e-mail server is determined based on a domain name included in the e-mail address.

* * * * *